(12) United States Patent
Williams-Stroud et al.

(10) Patent No.: US 8,902,710 B2
(45) Date of Patent: Dec. 2, 2014

(54) METHOD FOR DETERMINING DISCRETE FRACTURE NETWORKS FROM PASSIVE SEISMIC SIGNALS AND ITS APPLICATION TO SUBSURFACE RESERVOIR SIMULATION

(75) Inventors: Sherilyn C Williams-Stroud, Houston, TX (US); Leo Eisner, Houston, TX (US)

(73) Assignee: Microseismic, Inc., Houston, TX (US)

( * ) Notice: Subject to any disclaimer, the term of this patent is extended or adjusted under 35 U.S.C. 154(b) by 1048 days.

(21) Appl. No.: 12/615,783

(22) Filed: Nov. 10, 2009

(65) Prior Publication Data
US 2011/0110191 A1  May 12, 2011

(51) Int. Cl.
G01V 1/28  (2006.01)

(52) U.S. Cl.
CPC .......... *G01V 1/288* (2013.01); *G01V 2210/123* (2013.01)
USPC .......................................................... 367/73

(58) Field of Classification Search
CPC ..................... G01V 1/288; G01V 2210/123
USPC ............. 175/40, 50; 181/106; 367/73, 86, 25, 367/55; 702/11, 14, 15, 16; 703/1; 382/155, 382/207, 218
See application file for complete search history.

(56) References Cited

U.S. PATENT DOCUMENTS

| | | | |
|---|---|---|---|
| 5,148,110 A | 9/1992 | Helms | |
| 5,377,104 A | 12/1994 | Sorrells et al. | |
| 5,774,419 A | 6/1998 | Uhl et al. | |
| 5,934,373 A | 8/1999 | Warpinski et al. | |
| 5,996,726 A | 12/1999 | Sorrells et al. | |
| 6,049,508 A | 4/2000 | Delflandre | |
| 6,389,361 B1 | 5/2002 | Geiser | |
| 6,414,492 B1 | 7/2002 | Meyer et al. | |
| 6,462,549 B1 | 10/2002 | Curtis et al. | |
| 6,947,843 B2 | 9/2005 | Fisher et al. | |
| 6,963,667 B2 * | 11/2005 | Rajagopal et al. | 382/218 |
| 6,985,816 B2 | 1/2006 | Sorrells et al. | |
| 7,383,133 B1 | 6/2008 | Scott | |
| 7,400,978 B2 * | 7/2008 | Langlais et al. | 702/14 |

(Continued)

OTHER PUBLICATIONS

La Pointe et al., "3-D reservoir and stochastic fracture network modelling for enhanced oil recovery, Circle Ridge Phospohoria / Tensleep Reservoir, Wind River Reservation, Arapaho and Shoshone Tribes, Wyoming," Golder Associates Inc., Report DE-FG26-00BC15190, Semi-Annual Report Nov. 1, 2000-Apr. 31, 2001.*

(Continued)

*Primary Examiner* — Daniel L Murphy
(74) *Attorney, Agent, or Firm* — Richard A. Fagin

(57) ABSTRACT

A method for mapping a fracture network that includes determining a source of at least one seismic event from features in recorded seismic signals exceeding a selected amplitude ("visible seismic event"). The signals are generated by a plurality of seismic receivers disposed proximate a volume of subsurface to be evaluated. The signals are electrical or optical and represent seismic amplitude. A source mechanism of the at least one visible seismic event is determined. A fracture size and orientation are determined from the source mechanism. Seismic events are determined from the signals from features less than the selected amplitude ("invisible seismic events") using a stacking procedure. A source mechanism for the invisible seismic events is determined by matched filtering. At least one fracture is defined from the invisible seismic events. A fracture network model is generated by combining the fracture determined from the visible seismic event with the fracture determined from the invisible seismic events.

13 Claims, 5 Drawing Sheets

(56) References Cited

U.S. PATENT DOCUMENTS

| | | | |
|---|---|---|---|
| 7,508,735 B2 | 3/2009 | Grechka | |
| 7,660,194 B2 * | 2/2010 | Uhl et al. | 367/25 |
| 2008/0068928 A1 | 3/2008 | Duncan et al. | |

OTHER PUBLICATIONS

Langston, C., Source Inversion of Seismic Waveforms: The Koyna, India, Earthquakes of Sep. 13, 1967, Bulletin of Geological Society of America, Feb. 1981.

Dershowitz, W., Discrete Fracture Network Modeling of Induced Seismicisty, Geological Society of America, 2003 Annual Meeting (abstract only).

Lees, J., Multiplet Analysis at Coso Geothermal, Bulletin of the Seismological Society of America, vol. 88, No. 5, pp. 1127-1143, Oct. 1998.

Xu, W. et al., Characterization of Hydrualically-Induced Fracture Network, Paper 125237, SPE International, Richardson, TX, Tight Gas Conference, Jun. 15-17, 2009.

Tomic, J. et al, Source parameters and rupture velocity of smallM ≤ 2.1 reservoir induced earthquakes, Geophys. J. Int. (Apr. 2009).

Jost, M. et al., A Student's Guide to and Review of Moment Tensors, Seismological Research Letters, v. 60, No. 2, Apr.-Jun. 1989.

S. Gibbons, F. Ringdal, "The detection of low magnitude seismic events using array-based waveform correlations", Geophys. J. Int. vol. 15, 2006, pp. 149-166.

* cited by examiner

METHOD FOR DETERMINING DISCRETE FRACTURE NETWORKS FROM PASSIVE SEISMIC SIGNALS AND ITS APPLICATION TO SUBSURFACE RESERVOIR SIMULATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of determining subsurface structures from passive seismic signals. More specifically, the invention relates to methods for determining networks of rock formation fractures using passive seismic signals. The fracture network may be used as input to simulations of fluid flow through subsurface reservoirs.

2. Background Art

Reservoir simulation is a process by which fluid flow from one or more permeable subsurface rock formations is estimated with respect to time. Such estimation is important, for example, in determining the economic value of a subsurface hydrocarbon reservoir. The estimation is also useful in determining most profitable places to drill wellbores through such reservoirs, production rates of existing wells and the numbers of such wellbores that will most economically drain useful materials from the reservoir (e.g., oil and gas).

The performance of a subsurface reservoir is related to, among other factors, the spatial distribution of permeability in the reservoir. Methods are known in the art for estimating permeability distribution for "matrix" permeability, that is, permeability resulting from interconnections between the pore spaces of porous rock formations. Another type of permeability that is present in some reservoirs, and has proven more difficult to simulate is so called "fracture" permeability. Fracture permeability is associated with breaks or fractures in the rock formation. Fractures may be caused by a number of different mechanisms, including pumping fluid into the rock formation, withdrawing fluid from the formation, tectonic stress, pore pressure changes related to hydrocarbon generation or changes in the weight distribution of the rock formations ("overburden") above the reservoir rock formation.

One technique for estimating fracture permeability is to generate a discrete fracture network model. Methods to generate possible fracture distributions generally rely on stochastic approaches that also depend on seismic or structural attributes measured from the reservoir rock by using surface active source seismic data, e.g. amplitude vs. offset (AVO) or anisotropic (e.g. horizontal transverse isotropy—HTI) analyses, combined with fracture orientation and frequency statistics acquired from downhole data sources, e.g., well logs and pressure measurements.

Fractured reservoir models of natural fracture networks provide a basis for generating fluid permeability in reservoir rock related to existing fractures by modeling fracture networks with various distributions of fracture size (surface area of the crack face), aperture (distance between the two sides of the broken rock), and orientation. When fracture orientation measurements are not available from downhole data sources and cannot be interpreted from active surface seismic attributes, fracture orientations have been modeled from structural deformation using assumptions regarding stress and strain at the time of deformation. In general, there are very few measurements that can provide fracture size in a particular reservoir away from the wellbore.

Fracture data from downhole sources, however, are accurate only near the wellbore and fracture data from seismic attributes, while providing a constraint for fracture character at the reservoir scale, is accurate for fracture or fault features that can be resolved in the seismic data, in other words downhole measurements usually provide estimates on a significantly different scale than the reservoir scale and need to be upscaled through some assumptions. Seismic anisotropy attributes which can be interpreted to indicate fractures at the scale of tens of meters (the scale of importance for reservoir simulation flow modeling) are not directly imaged in an active source surface seismic volume and seismic anisotropy is only an indirect measurement of the fractures as it may originate from multiple other phenomena (background stress, unaccounted heterogeneity).

Microseismicity induced by reservoir stimulation of the geothermal field has been used to map fracture density. See, Lees, J. M., 1998, *Multiplet analyses at Coso geothermal*: Bulletin of The Seismological Society of America, 88, 1127-1143. In the Lees publication, a downhole monitoring array of several geophones was used to locate and invert source mechanisms, which provide estimates of fracture orientation. Density of the located events was then used to constrain the fracture density in a reservoir model.

Source mechanism inversion is described in, Jost and Herman, 1989, *Seismological Research Letters*, Vol. 60, pp 37-57, and in Aki and Richards, *Quantitative Seismology*, 1980.

Methods for modeling discrete fracture networks are described by Dershowitz, W., and Herda, H., 1992, *Interpretation of fracture spacing and intensity*, in Rock Mechanics, J. R. Tillerson and W. R. Wawersik (eds.), Balkema, Rotterdam, p. 757-766, and La Point P. R., Hermanson J., Thorsten E., Dunleavy M., Whitney J. and Eubanks D. 2001. *3-D reservoir and stochastic fracture network modelling for enhanced oil recovery, Circle Ridge Phospohoria/Tensleep Reservoir, Wind River Reservation, Arapaho and Shoshone Tribes, Wyoming*: Golder Associates Inc., Report DE-FG26-00BC15190, Dec. 7, 2001, 63 p. Several commercial software packages are available that use these methods to generate fracture models. To do reservoir simulation, the fracture networks are used to calculate flow properties given a particular fracture network configuration. One of many methods for calculating fracture permeability is described in Oda, M. 1985, *Permeability Tensor for Discontinuous Rock Masses*, Geotechnique Vol. 35, p 483.

The above methods have proven less than satisfactory for use with reservoir simulation. There exists a need for methods for generating models of discrete fracture networks that better account for the source mechanism of stochastically determined fractures.

SUMMARY OF THE INVENTION

A method for mapping a fracture network from microseismic signals according to one aspect of the invention include determining a source of at least one seismic event from features in the signals exceeding a selected amplitude ("visible seismic event"). The signals are generated by recording output of a plurality of seismic receivers disposed proximate a volume of the Earth's subsurface to be evaluated. The signals are electrical or optical and represent seismic amplitude. A source mechanism of the at least one visible seismic event is determined. A fracture size and orientation are determined from the source mechanism. Seismic events are determined from the signals from features less than the selected amplitude ("invisible seismic events") using a stacking procedure. A source mechanism for the invisible seismic events is determined by matched filtering. At least one fracture is defined from the invisible seismic events. A fracture network model is generated by combining the at least one fracture determined from the visible seismic event with the at least one fracture determined from the invisible seismic events.

Other aspects and advantages of the invention will be apparent from the following description and the appended claims.

DETAILED DESCRIPTION

Figure 1:
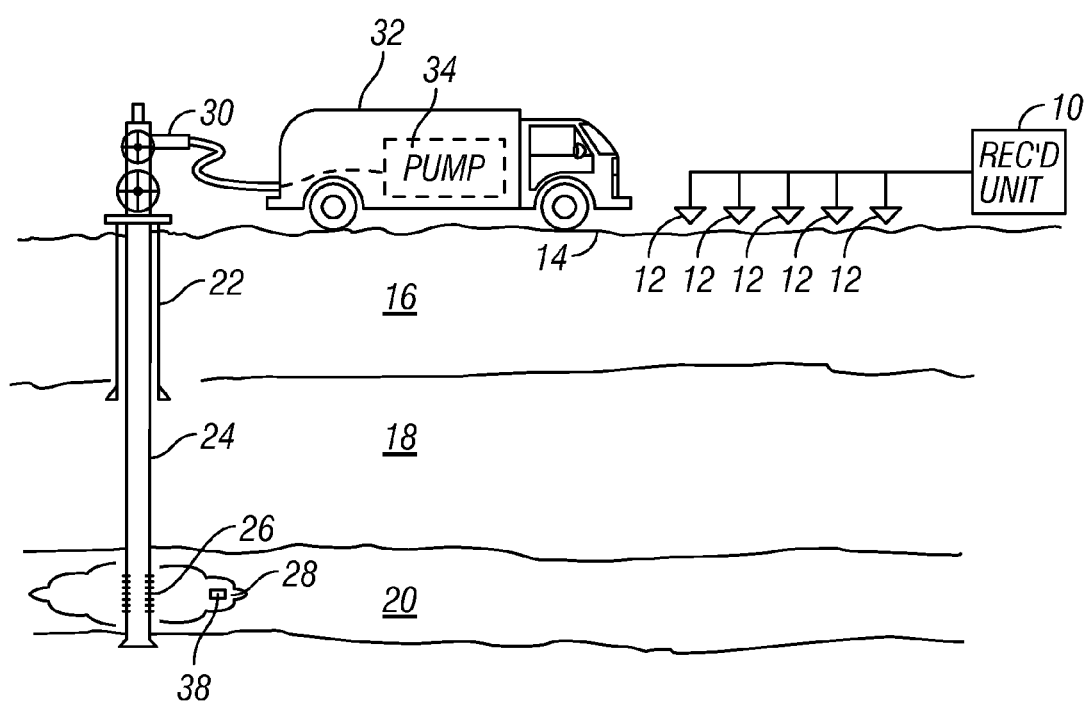
FIG. 1 schematically shows acquiring seismic signals that may be used in a method according to the invention.

FIG. 1 shows a typical arrangement of seismic receivers as they would be used in one application of a method according to the invention. The embodiment illustrated in FIG. 1 is associated with an application for passive seismic emission tomography known as "fracture monitoring." It should be clearly understood that the application illustrated in FIG. 1 is only one possible application of a method according to the invention. In other applications, passive seismic monitoring may take place in the absence of equipment shown in FIG. 1 used for pumping fluids into the subsurface formations.

In FIG. 1, each of a plurality of seismic receivers, shown generally at 12, is deployed at a selected position proximate the Earth's surface 14, generally above or proximate to a volume of the subsurface to be evaluated. The seismic receivers 12 can also be deployed in one or more wellbores (not shown) drilled through the subsurface. In marine applications, the seismic receivers would typically be deployed on the water bottom in a device known as an "ocean bottom cable." The seismic receivers 12 in the present embodiment may be geophones, but may also be accelerometers or any other sensing device known in the art that is responsive to velocity, acceleration or motion of the particles of the Earth proximate the sensor. The seismic receivers 12 may also be "multicomponent" receivers, that is, they may each have three sensing elements such as geophones or accelerometers disposed generally along mutually orthogonal directions, but they can be also single component, typically the vertical component only. The seismic receivers 12 generate electrical or optical signals in response to the particle motion or acceleration, such signals generally being related in amplitude to seismic amplitude, and such signals are ultimately coupled to a recording unit 10 for making a time-indexed recording of the signals from each sensor 12 for later interpretation by a method according to the invention. In other implementations, the seismic receivers 12 may be disposed at various positions within one or more monitor wellbores (not shown) drilled through the subsurface formations. A particular advantage of the method of the invention is that it provides generally useful results when the seismic receivers are disposed at or near the Earth's surface. Surface deployment of seismic receivers is relatively cost and time effective as contrasted with subsurface sensor emplacements. It is important that the surface or subsurface (e.g., wellbore) receivers are deployed along multiple azimuths and offsets. This is important for proper performance of the source mechanism inversion (explained below) which would otherwise be unconstrained. Irrespective of the deployment, the seismic receivers are generally deployed proximate an area or volume of the Earth's subsurface to be evaluated.

In some examples, the seismic receivers 12 may be arranged in sub-groups having spacing therebetween less than about one-half the expected wavelength of seismic energy from the Earth's subsurface that is intended to be detected. Signals from all the receivers in one or more of the sub-groups may be added or summed to reduce the effects of noise in the detected signals.

In the present example, a wellbore 22 is shown drilled through various subsurface Earth formations 16, 18, and through a hydrocarbon producing formation 20. A wellbore tubing or casing 24 having perforations 26 formed therein corresponding to the depth of the hydrocarbon producing formation 20 is connected to a valve set known as a wellhead 30 disposed at the Earth's surface. The wellbore 22 may be used in some examples to withdraw fluids from the formation 20. Such fluid withdrawal may result in microseismic events being generated in the subsurface.

In the present example, the wellhead may be hydraulically connected to a pump 34 in a fracture pumping unit 32. The fracture pumping unit 32 is used in the process of pumping a fluid, which in some instances includes selected size solid particles, collectively called "proppant", are disposed. Pumping such fluid, whether propped or otherwise, is known as hydraulic fracturing. The movement of the fluid is shown schematically at the fluid front 28 in FIG. 1. In hydraulic fracturing techniques known in the art, the fluid is pumped at a pressure which exceeds the fracture pressure of the particular producing formation 20, causing it to rupture, and form fractures therein. The fracture pressure is generally related to the pressure exerted by the weight of all the formations 16, 18 disposed above the hydrocarbon producing formation 20, and such pressure is generally referred to as the "overburden pressure." In propped fracturing operations, the particles of the proppant move into such fissures and remain therein after the fluid pressure is reduced below the fracture pressure of the formation 20. The proppant, by appropriate selection of particle size distribution and shape, forms a high permeability channel in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

The fracturing of the formation 20 by the fluid pressure is one possible source of seismic energy that is detected by the seismic receivers 12. The time at which the seismic energy is detected by each of the receivers 12 with respect to the time-dependent position in the subsurface of the formation fracture caused at the fluid front 28 is related to the acoustic velocity of each of the formations 16, 18, 20, and the position of each of the seismic receivers 12. Typically the acoustic velocity of the formations 16, 18, 20 will have been previously determined from, for example, an active source seismic survey.

It should be noted that the same arrangement of receivers as shown in FIG. 1 may be used to detect naturally occurring seismic energy and the procedure for processing the seismic data will be substantially the same irrespective of whether fracture fluid is pumped.

Having explained one type of passive seismic data that may be used with methods according to the invention, a method for processing such seismic data will now be explained. The processing may take place on a programmable computer (not shown separately in FIG. 1) that forms part of the recording unit 10. The processing may take place on any other computer, as will be explained with reference to FIG. 6. The seismic signals recorded from each of the receivers 12 may be processed first by certain procedures well known in the art of seismic data processing, including the summing described above, and various forms of filtering. In some embodiments, the receivers 12 may be arranged in directions substantially along a direction of propagation of acoustic energy that may be generated by the pumping unit 32, in the embodiment of FIG. 1 radially outward away from the wellhead 30. By such arrangement of the seismic receivers 12, noise from the pumping unit 32 and similar sources near the wellhead 30 may be attenuated in the seismic signals by frequency-wavenumber (f k) filtering. Other processing techniques for noise reduction and/or signal enhancement will occur to those of ordinary skill in the art.

Figure 2:
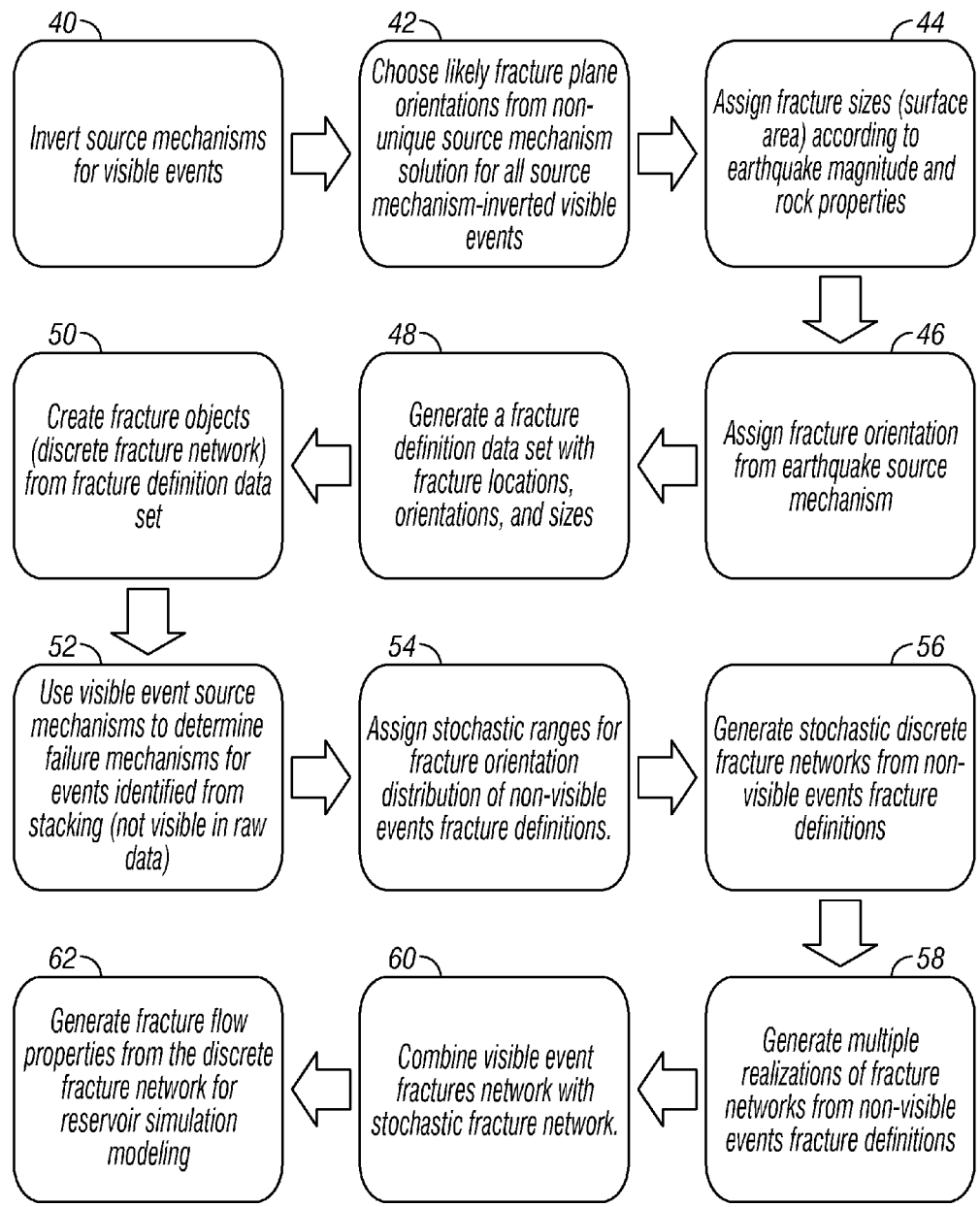
FIG. 2 is a flow chart of a fracture network modelling method according to the invention.

Referring to FIG. 2, an example process to model a discrete fracture network using the signals recorded as explained above will be explained as to its general procedural elements. More detailed examples of some of the elements of the process will be explained with reference to FIGS. 3, 4 and 5. At 40, "visible" events are identified in the recorded seismic signals. Visible events may be determined, for example, by visual observation of the data recording from each receiver, and visually selecting amplitudes with have an appearance suggestive of a common seismic event source. "Visible" events may be automatically identified by the computer (FIG. 1 or FIG. 6), for example, by setting a threshold amplitude and having the computer read the data recordings. Any amplitudes above the threshold will be identified as "visible" events. The position of such visible events in the subsurface may be determined using techniques known in the art. Most such techniques use the arrival time of the event on each recording, the position of the respective receivers and the velocity distribution of the formations in the subsurface to identify a most likely origin corresponding to the respective arrival times.

Figure 5:
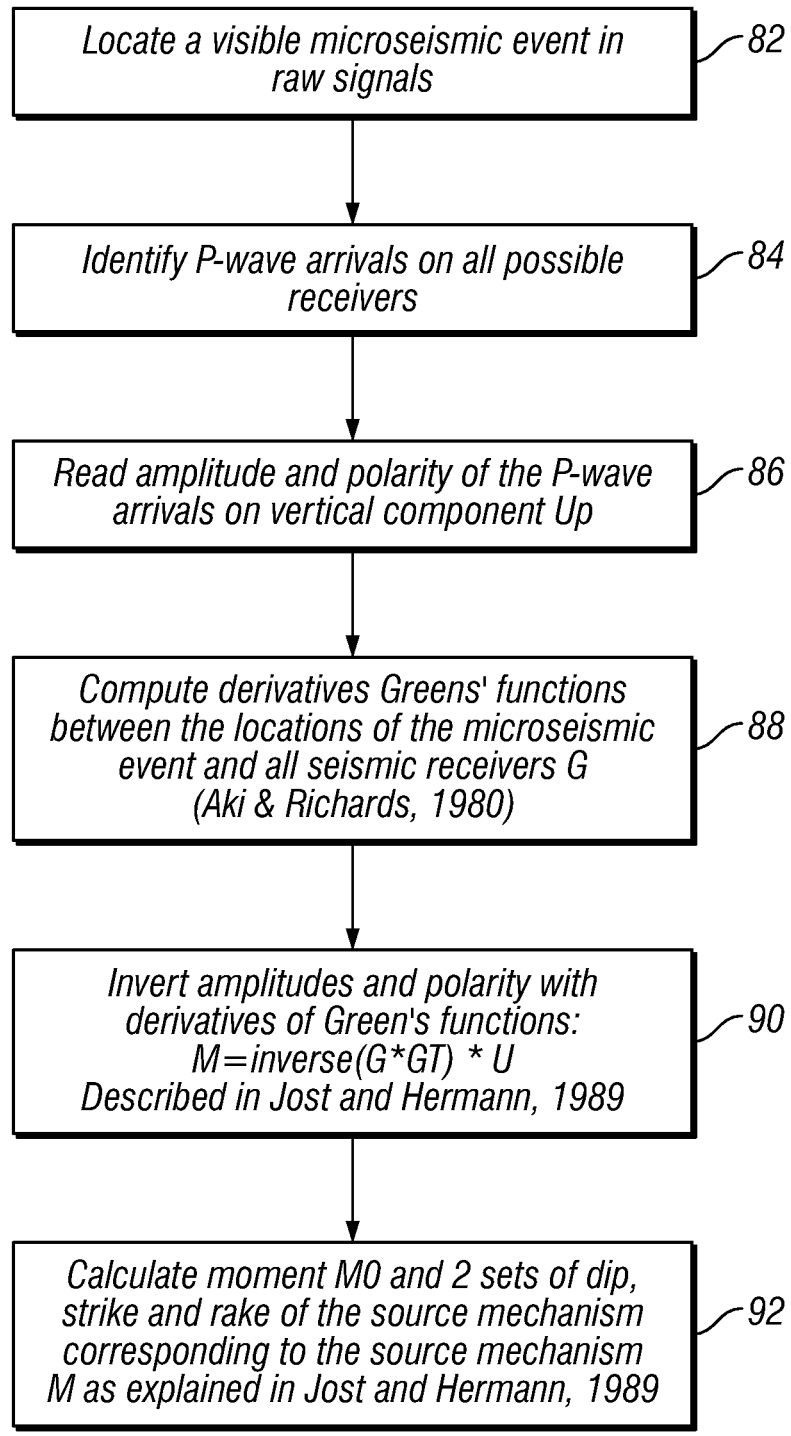
FIG. 5 shows a flow chart of an example technique for source mechanism inversion from microseismic signals.

Each such visible microseismic event is characterized by its "source mechanism". Identification of the source mechanism means determining the direction of the volumetric opening, complexity of the fracture plane, fracture plane orientation, the motion of the formations along the fracture plane, and the area subtended by the fracture. Referring to FIG. 5, one method for determining the source mechanism is referred to as "inversion." At 82, the visible events are determined, as explained above. At 84, compressional wave arrivals are determined, also as explained above. At 86, the amplitude of the compressional arrivals' vertical components in the upward direction may be determined. Techniques known in the art for the foregoing include adjusting the amplitude recorded at each receiver for the direction of propagation of the seismic energy from the source location to each receiver. At 88, derivatives of Greens' functions for all seismic event locations and all receiver locations are determined. The foregoing is described, for example, in Aki and Richards, *Quantitative Seismology*, 1980. At 90, the amplitudes and polarities previously determined from the observed data are inverted with the Greens' function derivatives. The foregoing is described, for example, in Jost and Herman, 1989, *Seismological Research Letters*, Vol. 60, pp 37-57. At 92, the source mechanism consisting of source moment M0 and the dip, strike and rake of the microseismic events, volumetric change and compensated linear vector dipole are determined, for example, also as described in Jost and Herman, 1989.

Figure 3:
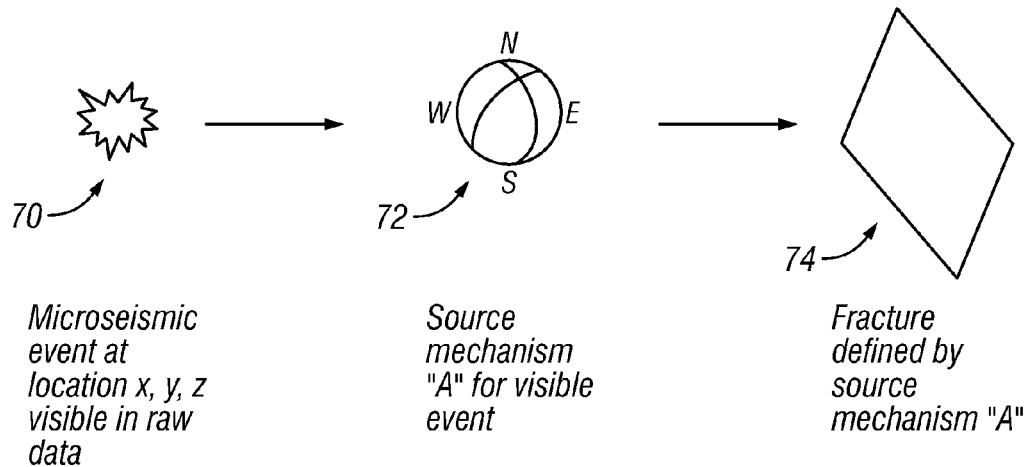
FIG. 3 shows identifying a source mechanism for a "visible" microseismic event.

Referring briefly to FIG. 3, thus for each identified visible event, at 70 located in the subsurface, a source mechanism is identified, at 72. Identification of the source mechanism enables determining, at 74 a fracture plane. Thus, one fracture plane will be identified for each visible seismic event.

Returning to FIG. 2, at 44, each fracture plane previously identified can have a fracture size determined using an empirical relationship determined from microearthquake measurements. See, for example, Tomic, Abercrombie, and Nascimento, 2009, *Geophysics Journal International*, vol. 179, pp 1013-1023, where seismic moment is related to source radius. At 46, the orientation of the fracture is assigned using the source mechanism determined as explained with reference to FIG. 5. At 48, the foregoing fracture identification, sizing and orientation in the network model may be repeated for all the visible microseismic events. At 50, the visible microseismic event fracture network is completed.

At 52, the source mechanisms of the visible microseismic events may be used to estimate source mechanisms for microseismic events that are not visible in the recorded receiver signals. Such microseismic events may be determined, for example using a technique described in U.S. Patent Application Publication No. 2008/0068928 filed by Duncan et al., the underlying patent application for which is commonly owned with the present invention. Briefly, the method described in the Duncan et al. publication identifies microseismic events by transforming seismic signals into a domain of possible spatial positions of a source of seismic events and determining an origin in spatial position and time of at least one seismic event in the subsurface volume from the space and time distribution of at least one attribute of the transformed seismic data, the determining the origin in includes identifying events in the transformed signals that have characteristics corresponding to seismic events, and determining the origin when selected ones of the events meet predetermined space and time distribution criteria. The method described in the Duncan et al. publication is only one possible method to identify microseismic events that are invisible in the receiver signals. For purposes of defining the scope of the present invention, techniques such as the foregoing and others, which enable detection of microseismic events not visible in the recorded signals, may be referred to for convenience as "stacking" techniques because they generally include combination of signals from a plurality of the receivers.

Figure 4:
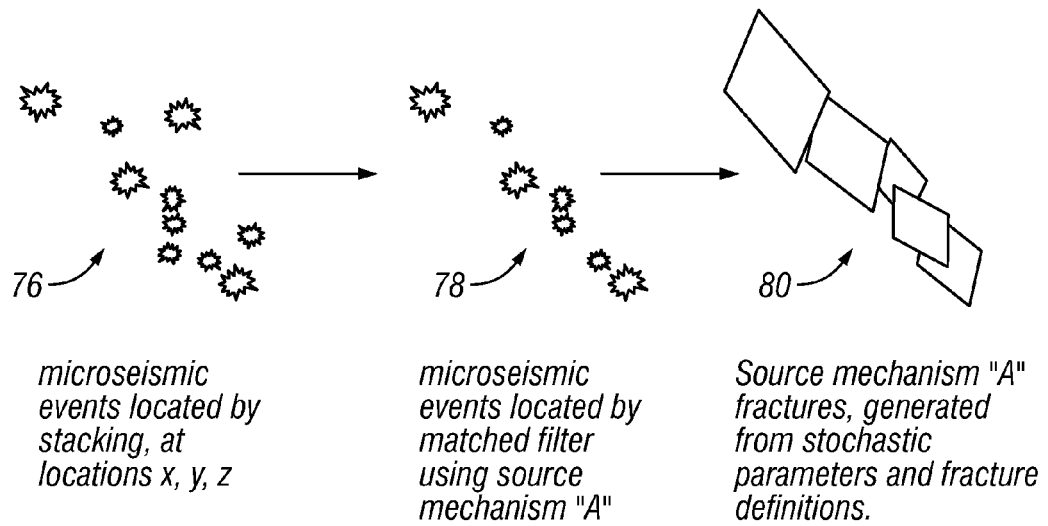
FIG. 4 shows identifying stochastic microseismic events having a common source mechanism.

Referring briefly to FIG. 4, at 76, invisible microseismic events are identified using processes such as explained above. At 78, those of the invisible identified microseismic events may be processed by a matching filter to identify those events having a selected source mechanism, for example, the source mechanism identified for each of the visible events. One example of matched filtering is described in, Steven J. Gibbons and Frode Ringdal, *The detection of low magnitude seismic events using array-based waveform correlation*, Geophys. J. Int. (2006) 165, 149-166. Briefly, the matched filtering can be implemented by selecting a correlation time window is for each of the seismic signal recordings. Each correlation window has a selected time interval including an arrival time of the at least one seismic event in each seismic signal. For example, the arrival time may include that of one of the visible events to ensure the source mechanisms are similar. Each window is correlated to the respective seismic signal between a first selected time and a second selected time. Presence of at least one other seismic event in the seismic signals is determined from a result of the correlating. The microseismic events identified using the matched filter are then used, at 80, to define fractures, using essentially the same procedure used to define the fractures for the visible events.

Returning to FIG. 2, at 54, stochastic ranges may be assigned for the fracture orientation distribution of the fractures identified from the invisible events. For example, fracture size distributions may be assigned according to common statistical distributions (e.g. normal, power-law, random). Orientations of the fractures may also be assigned according to statistical distributions as defined by 3D orientation distributions. At 56, stochastic discrete fracture networks may be generated from the foregoing fracture definitions. At 58, multiple realizations of fracture networks may be generated from the foregoing fracture definitions. Generating multiple fracture networks is used because orientations and fracture sizes are assigned stochastically, starting with a random "seed" generated for a particular discrete fracture network ("DFN"). Because the fracture network model is generated as a stochastic process based on a random starting state (the seed value), each time the model generation is performed it is with a different seed; therefore the result will be different. Each DFN will still have the same overall statistical characteristics, but the details of each fracture in each DFN may be different. Running multiple realizations (creating multiple results) effectively "smears" or distributes the impact of the randomness on the model. At 60, the visible event fracture network may be combined with the stochastic fracture network. At 62, a geocellular model may be generated from the combined fracture networks to estimate the spatial distribution of fluid flow properties. Geocellular models may be generated using commercially available software tools operable on a programmable computer. Examples of such software include 4DMOVE (a mark of Midland Valley Exploration, Ltd., Glasgow, United Kingdom), GOCAD (a mark of Paradigm Ltd., Georgetown, Cayman Islands), PETREL (a mark of Schlumberger Technology Corporation, Houston, Tex.), EVCELL (a mark of Dynamic Graphics, Inc., Alameda, Calif.). The geocellular model may be used as input to any compatible commercial reservoir simulation program to model the fluid flow properties of the reservoir (20 in FIG. 1). Example reservoir simulation programs include GEM and IMEX (marks of Computer Modeling Group, Inc., Houston, Tex.), ECLIPSE (a mark of Schlumberger Technology Corporation), and GOCAD (a mark of Paradigm Ltd.).

Figure 6:
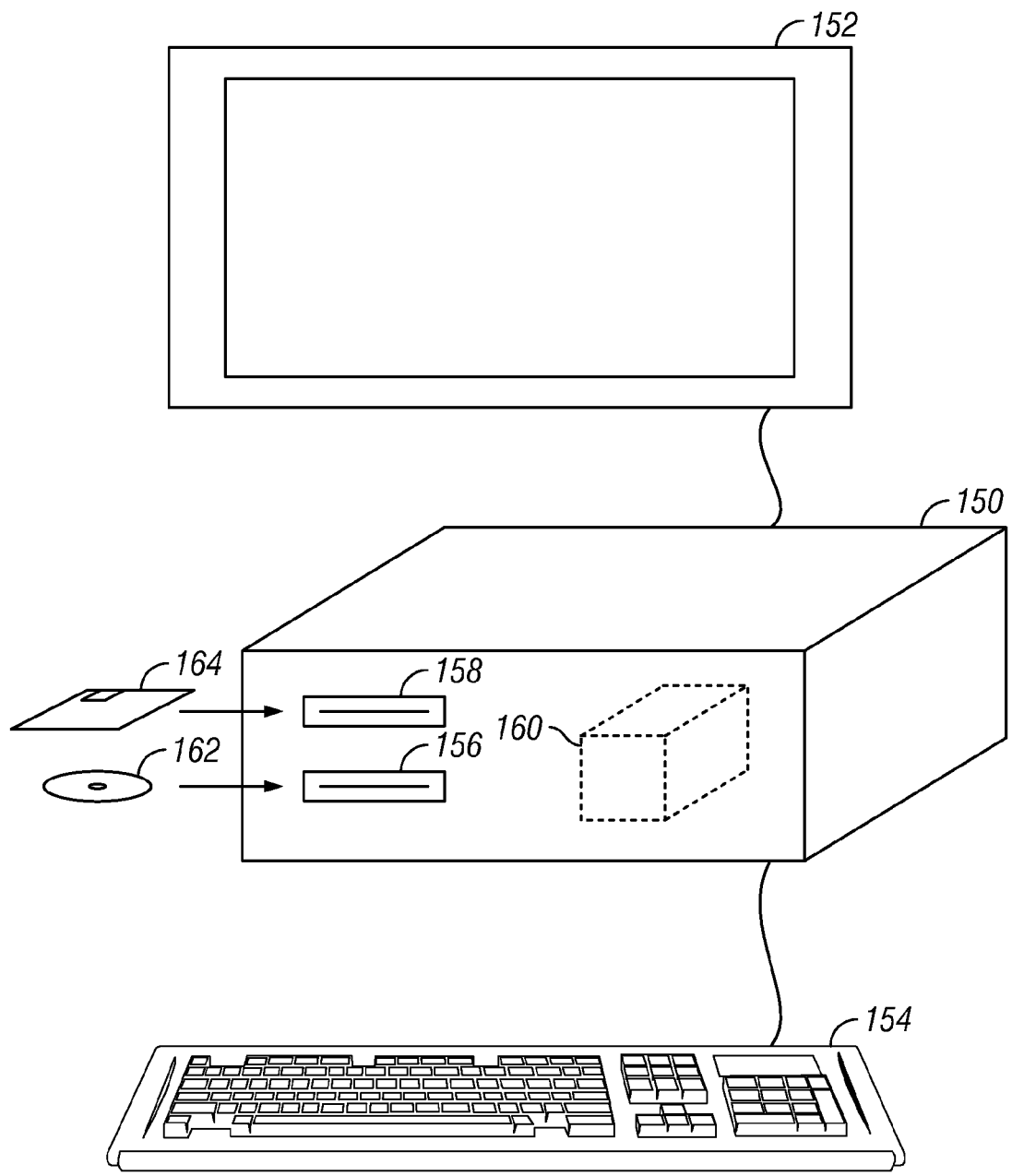
FIG. 6 shows a programmable computer, display and computer readable media.

In another aspect, the invention relates to computer programs stored in computer readable media. Referring to FIG. 6, the foregoing process as explained with reference to FIGS. 1-3, can be embodied in computer-readable code. The code can be stored on a computer readable medium, such as floppy disk 164, CD-ROM 162 or a magnetic (or other type) hard drive 166 forming part of a general purpose programmable computer. The computer, as known in the art, includes a central processing unit 150, a user input device such as a keyboard 154 and a user display 152 such as a flat panel LCD display or cathode ray tube display. The computer may form part of the recording unit (10 in FIG. 1) or may be another computer. According to this aspect of the invention, the computer readable medium includes logic operable to cause the computer to execute acts as set forth above and explained with respect to the previous figures. The user display 152 may also be configured to show hypocenter locations and fracture networks determined as explained above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for mapping a fracture network from microseismic signals, comprising:
    determining in a computer a source of at least one seismic event from features in the signals when the signals exceed a selected amplitude ("visible seismic event"), the signals generated by recording output of a plurality of seismic receivers disposed proximate a volume of the Earth's subsurface to be evaluated, the signals being electrical or optical and representing seismic amplitude;
    determining a source mechanism of the at least one visible seismic event in the computer, the source mechanism consisting of a source moment (M0) and a dip, a strike and rake of the at least one visible seismic event, a volumetric change and a compensated linear vector dipole;
    determining a fracture size and orientation from the source mechanism in the computer;
    determining seismic events from the signals from features when the signal amplitude is less than the selected amplitude ("invisible seismic events") in the computer using a stacking procedure;
    determining a source mechanism for the invisible seismic events by matched filtering in the computer;
    defining at least one fracture from the invisible seismic events in the computer; and
    generating a fracture network model in the computer by combining the at least one fracture determined from the visible seismic event with the at least one fracture defined from the invisible seismic events.

2. The method of claim 1 further comprising generating a geocellular model from the fracture network model in the computer.

3. The method of claim 1 wherein the source mechanism for the at least one fracture from the visible seismic event is determined by inversion processing.

4. The method of claim 1 further comprising determining a surface area of the at least one fracture from the at least one visible seismic event in the computer using an empirical relationship of fracture area with respect to magnitude applied to earthquakes.

5. The method of claim 1 further comprising identifying in the computer a plurality of invisible seismic events and defining a fracture for each; determining source mechanisms for the invisible seismic events using a source mechanism determined for each of a plurality of visible seismic events; in the computer assigning a stochastic range for orientations of the fractures determined from the invisible seismic events; and in the computer generating a stochastic discrete fracture network from the fractures determined from the invisible events.

6. The method of claim 5 further comprising repeating the assigning a stochastic range and generating a stochastic discrete fracture network from the fractures determined from the invisible events in the computer.

7. The method of claim 1 wherein the fractures are caused by pumping fluid into a subsurface rock formation.

8. A non-transitory computer readable medium having stored thereon a computer program, the program having logic operable to cause a programmable computer to perform steps, comprising;
   determining a source of at least one seismic event from features in recorded seismic signals read as input when the signals exceed a selected amplitude ("visible seismic event");
   determining a source mechanism of the at least one visible seismic event, the source mechanism consisting of a source moment (M0) and a dip, a strike and rake of the at least one visible seismic event, a volumetric change and a compensated linear vector dipole;
   determining a fracture size and orientation from the source mechanism;
   determining seismic events from the signals from features therein when the signal amplitude is less than the selected amplitude ("invisible seismic events") using a stacking procedure;
   determining a source mechanism for the invisible seismic events by matched filtering;
   defining at least one fracture from the invisible seismic events; and
   generating a fracture network model by combining the fracture determined from the visible seismic event with the fracture defined from the invisible seismic events.

9. The computer readable medium of claim 8 wherein the source mechanism for the at least one fracture from the visible seismic event is determined by inversion processing.

10. The computer readable medium of claim 8 further comprising logic in the program operable for determining a surface area of the at least one fracture from the at least one visible seismic event using an empirical relationship of fracture area with respect to magnitude applied to earthquakes.

11. The computer readable medium of claim 8 further comprising logic in the program operable for identifying a plurality of invisible seismic events and defining a fracture for each; determining source mechanisms for the invisible seismic events using a source mechanism determined for each of a plurality visible seismic events; assigning a stochastic range for orientations of the fractures determined from the invisible seismic events; and generating a stochastic discrete fracture network from the fractures determined from the invisible events.

12. The computer readable medium of claim 11 further comprising repeating the assigning a stochastic range and generating a stochastic discrete fracture network from the fractures determined from the invisible events.

13. The computer readable medium of claim 8 further comprising logic in the program operable for generating a geocellular model from the fracture network model.

* * * * *